United States Patent [19]

Krampe

[11] Patent Number: 4,787,144

[45] Date of Patent: Nov. 29, 1988

[54] CUTTING TOOL FOR STRIPPING CABLES

[76] Inventor: Josef Krampe, An der Vogelrute 32, 4715 Asheberg-Herbern, Fed. Rep. of Germany

[21] Appl. No.: 122,940

[22] Filed: Nov. 18, 1987

[30] Foreign Application Priority Data

Nov. 24, 1986 [DE] Fed. Rep. of Germany ....... 3640097

[51] Int. Cl.$^4$ ............................................. H02G 1/12
[52] U.S. Cl. ........................................ 30/90.7; 81/9.4
[58] Field of Search .................. 81/9.4; 30/90.1, 90.4, 30/90.7

[56] References Cited

U.S. PATENT DOCUMENTS 4,480,508 11/1984 Rich ...................................... 81/9.4

FOREIGN PATENT DOCUMENTS 2306031 8/1974 Fed. Rep. of Germany ......... 81/9.4
2735839 2/1978 Fed. Rep. of Germany ......... 81/9.4

Primary Examiner—Roscoe V. Parker
Attorney, Agent, or Firm—Michael J. Striker

[57] ABSTRACT

A cutting tool for stripping an insulation sheath from a cable guided in a chute formed in a tool housing comprises two driving levers for displacing the cable towards the blades for stripping the sheath. The two levers are positionable on the housing so as to drive the cable after the blades have cut the sheath.

7 Claims, 2 Drawing Sheets

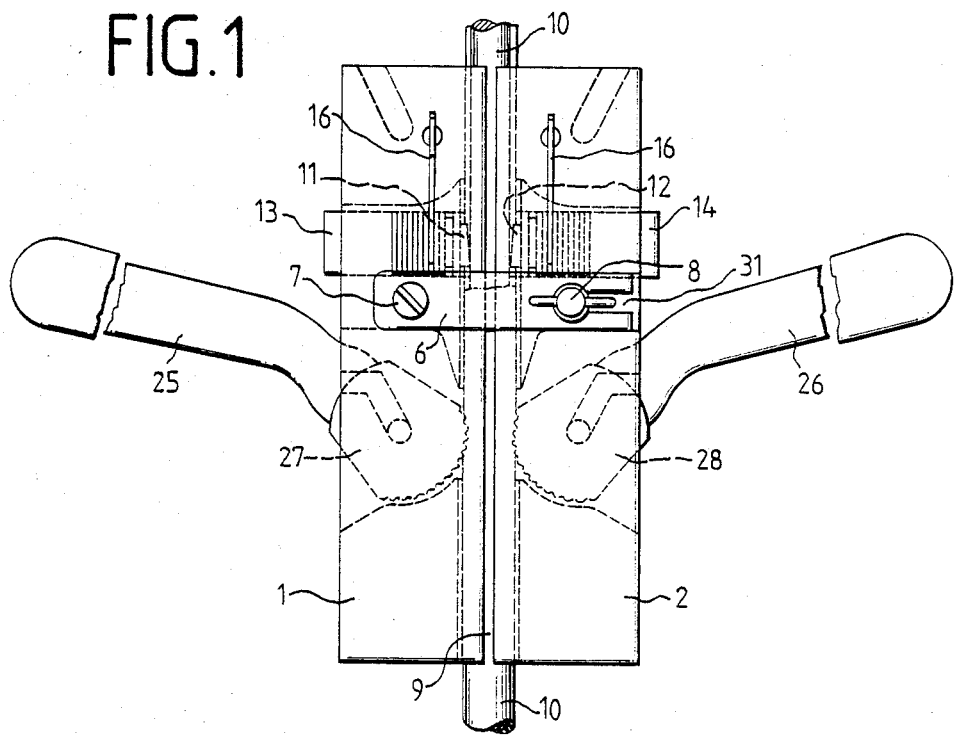
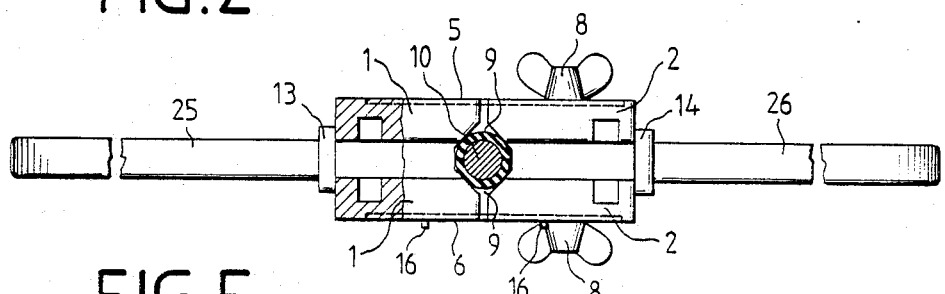
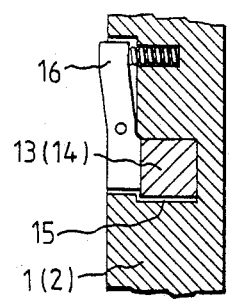
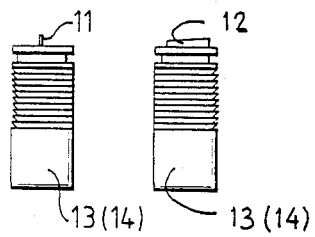

CUTTING TOOL FOR STRIPPING CABLES

BACKGROUND OF THE INVENTION

The present invention relates to cutting tools for stripping wires, cables or the like, and more particularly to a cutting tool for stripping cable sheathings of glass fiber cables by means of cutting blades slitting the sheathing from the cable while the cable is guided by a lever drive.

A number of solutions to strip a sheathing from a cable have been offered in the field of the invention. A cutting tool disclosed, for example in DT-OS 23 06 031 has in the region of the blade at least one gear for gripping the sheathing and displacing the cable and actuated by a manually driven lever drive. Due to the utilization of one or a number of toothed gears which directly grip the cable sheathing a force translation is obtained for an advanced movement of the blade immediately in the vicinity of the cutting blade and in the direction of the sheathing outer surface so that satisfactory cutting guidance towards the axis of the cable is achieved. The gear or gears are actuated in the simple fashion by the lever drive with a force translation.

The disadvantage of this otherwise satisfactory known device resides in that the hand-operated tools of the type can be used as a rule only for stripping thin-walled cable sheathings. The cable sheaths are either too hard or too thick. In both cases it seems to be impossible that easy cuts or cut guidance can be performed with a hand-operated tool itself and with a lever drive with a force translation without damaging the cable interior part.

SUMMARY OF THE INVENTION

It is an object of the present invention to provide an improved cutting tool for stripping cable insulation.

It is another object of the invention to provide an insulation-stripping tool for cables which would enable the removal of thick sheathings from cables, that is the removal of insulation layers formed of various materials and also with a force application which would be adjusted to the various uses of the cutting tool.

These and other objects of the invention are attained by a cutting tool for stripping an insulation sheath from cables, particularly glass fiber cables, comprising blades for slitting a sheath from a cable; a lever drive for driving the cable; and a housing accommodating said blades and having a chute for guiding said cable, said drive including a hand-actuated lever pair with levers arranged opposite said chute and positionable in said housing interchangeably in different operative positions, said blades being arranged between places of supporting said lever pair in said chute.

The housing of the tool may include two portions which form said chute, said portions being adjustably connected to each other so as to define a size of said chute; the tool further including blade holders for holding said blades, said housing having a channel accommodating said blade holders, said housing further having above and below said channel pocket-shaped recesses for supporting the levers of said lever pair selectively above or below said channel.

The housing may have oblong openings inclined to said chute and positioned above and below said channel for supporting the levers of said lever pair interchangeably in said different operative positions.

The aforementioned channel may extend transversely of said chute and accommodate two said blade holders positioned diametrically opposite to each other relative to said chute, the blades of said holders extending into said chute by a cable sheath thickness.

The blade holders may be adjustable in said channel relative to said chute, a pair of levers being spring-biased for engaging toothings by which said blade holders are locked in said housing and on a sheath to be stripped.

The tool may further include shackles for releasably connecting said portions of said housing to each other.

The portions of the housing may be formed oblique at opposite end edges thereof so as to form said chute in an interior of said housing.

Due to the utilization of the driving lever pair the position of which is interchangeable in the housing guiding the cable relative to the blades or cutters the tool can be easily operated by two hands so that a full manual force can be applied to the tool for an insulation-stripping process which would result in stripping of even thick layers of insulation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a front view of the cutting tool according to the invention;

FIG. 2 is a top plan view of the cutting tool of FIG. 1;

FIG. 5 is a partial sectional view of the housing with a locking arrangement for the cutter holder;

FIG. 6a shows a front view of the cutter holder; and

FIG. 6b a side view of the cutter holder.

DETAILED DESCRIPTION OF THE PREFERRED EMBODIMENT

Figure 3:
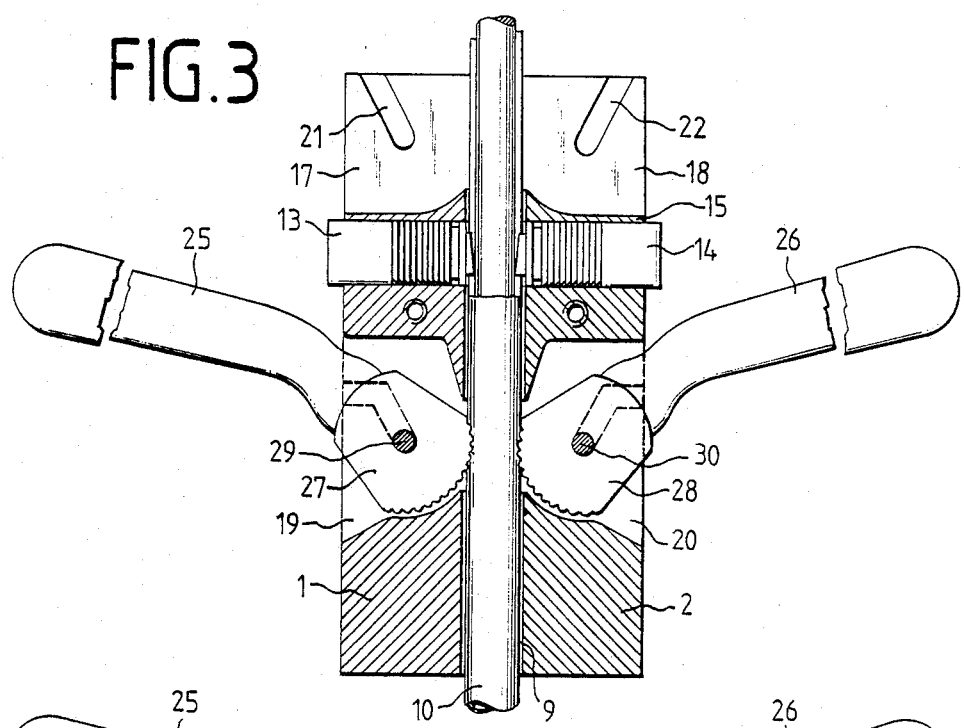
FIG. 3 is an elevated sectional view of the cutting tool.

Referring now to the drawings in detail, it will be seen that the cutting tool according to the invention includes a practically rectangular housing which is assembled of housing portions 1 and 2 which are releasably connected to each other by opposing shackles or clips 5, 6. Bolts 7, 8, of which bolt 8 is formed as a wing bolt for facilitating the adjustment of the housing portions 1 and 2 to each other, serve for a releasable connection of these housing portions. The front edges of the housing portions 1, 2 which abut against each other in the middle of the housing are inclined or canted over the entire length and form a chute 9 vertically extending through the housing. This chute 9 serves the purpose of guiding a cable 10 with the insulation to be stripped off during the transport of the cable towards the cutters 11, 12. The cutters 11, 12 are positioned in cutter holders 13, 14 which are longitudinally displaceable transversely to the chute 9 and relative to the latter and are lockable by spring-biased levers 16 and toothings provided on the external walls of the cutter holders 13, 14 lying opposite the levers 16. The cutter holders 13, 14 are manually adjustable in channel 15.

Pocket-shaped recesses 17, 18 or 19, 20 which are diametrically opposite each other, respectively are provided at the end sides of the housing portions 1, 2 above and below the cutter holders 13, 14 or their channel 15. Recesses 17, 18 have at the walls thereof oblong holes 21, 22 which are inclined relative to the chute 9. Recess 19, 20 in turn have in the walls thereof oblong holes 23, 24 which in addition to the inclined portions similar to those of holes 21, 22 have horizontal portions at their open ends.

Figure 4:
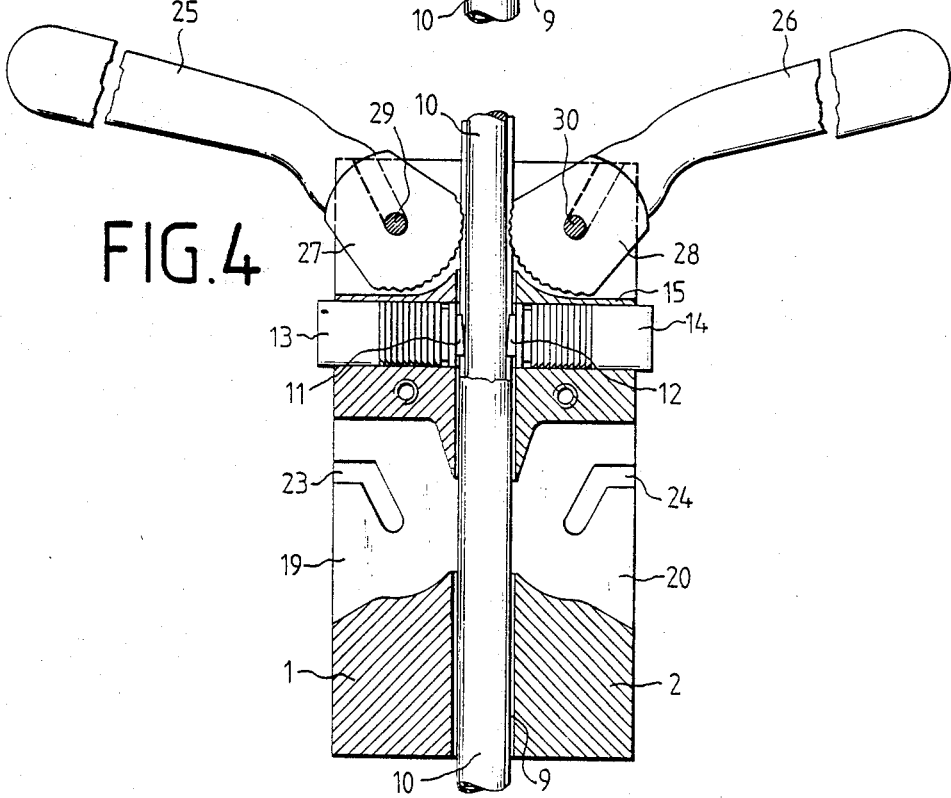
FIG. 4 is an elevated sectional view of the drive lever pair in another operative position.

A driving lever pair which comprises two levers 25, 26 serves to transport cable 10 through the cutting tool or its chute 9. Levers 25, 26 are provided at their internal ends with toothed gears 27, 28, respectively which are connected to the remaining parts of the levers by bearing pins 29, 30. The driving lever pair is positioned, as shown in FIG. 3, below the cutter holders 13, 14 in the oblong holes 23, 24 into which respective pins 29, 30 are inserted. They can be alternatively inserted into oblong holes 21, 22 as shown in FIG. 4. Depending upon the illustrated operative position of the driving lever pair it can be achieved that cable 10 be gripped, on the one hand, below and, on the other hand, above the cutter holders 13, 14 by toothed gears 27, 28 and transported by the same from these places through the chute 9. FIG. 3 shows that when the driving lever pair is positioned below the cutter holders 13, 14, cable 10, upon the actuation of levers 25, 26 and a respective rotation of gears 27, 28, will be displaced with a simultaneous stripping of its insulation or sheathing at both sides to the position above cutting blades 11, 12. When the driving lever pair is positioned above the cutter holders 13, 14 as shown in FIG. 4, the cutting process takes place upon the above described function of the driving lever pair 25, 26, as the cable 10 is drawn until a desired length of stripped-off insulation is obtained. Thereby the actuation of the driving lever pair in this operative position has the advantage that the gears 27, 28 can only damage the cut-off insulation while the cable 10 or its sheathing positioned before cutters 11, 12 remain undamaged.

The cutting tool can be adjusted to different cable thicknesses in that the distance between housing portions 1 and 2 can be respectively changed which is possible, as described above, by loosening the wing bolt 9 and adjusting the housing portions 1, 2 relative to each other by means of oblong holes 31 of shackles 5, 6.

With reference to FIG. 5 it will be seen that cutter holders 13, 14 can be turned by 90° in the channel 15. The cutting tool according to the invention is suitable also for making round cuts. Instead of actuating of the driving lever pair the cutting tool can then be turned about the axis of cable 10. Cutter holders 13, 14 can have for this function further toothings on the external walls as shown in FIGS. 6a and 6b.

It will be understood that each of the elements described above, or two or more together, may also find a useful application in other types of cable stripping tools differing from the types described above.

While the invention has been illustrated and described as embodied in a tool for stripping cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cutting tool for stripping an insulation sheath from cables, particularly glass fiber cables, comprising blades for slitting a sheath from a cable; a lever drive for driving the cable; and a housing accommodating said blades and having a chute for guiding said cable, said drive including a hand-actuated lever pair with levers arranged opposite said chute and positionable in said housing interchangeably in different operative positions, said blades being arranged between places of supporting said lever pair in said chute.

2. The tool as defined in claim 1, wherein said housing includes two portions which form said chute, said portions being adjustably connected to each other so as to define a size of said chute; and further including blade holders for holding said blades, said housing having a channel accommodating said blade holders, said housing further having above and below said channel pocket-shaped recesses for supporting the levers of said lever pair selectively above or below said channel.

3. The tool as defined in claim 2, wherein said housing has oblong openings inclined to said chute and positioned above and below said channel for supporting the levers of said lever pair interchangeably in said different operative positions.

4. The tool as defined in claim 2, wherein said channel extends transversely of said chute and accommodates two said blade holders positioned diametrically opposite to each other relative to said chute, the blades of said holders extending into said chute by a cable sheath thickness.

5. The tool as defined in claim 4, wherein said blade holders are adjustable in said channel relative to said chute, a pair of lever being spring-biased for engaging toothings by which said blade holders are locked in said housing and on a sheath to be stripped.

6. The tool as defined in claim 2; further including shackles for releasably connecting said portions of said housing to each other.

7. The tool as defined in claim 2, wherein said portions of said housing are inclined at opposite end edges thereof so as to form said chute in an interior of said housing.

* * * * *